Nov. 23, 1926.

G. L. CROWDER 1,607,873

NUT FOR VALVE STEMS

Filed April 17, 1925

Inventor
G. L. Crowder
By C. A. Snow & Co.
Attorneys

Patented Nov. 23, 1926.

1,607,873

UNITED STATES PATENT OFFICE.

GEORGE L. CROWDER, OF DANVILLE, VIRGINIA.

NUT FOR VALVE STEMS.

Application filed April 17, 1925. Serial No. 23,928.

This invention relates to a novel form of nut, especially designed for use in connection with valve stems of pneumatic tires.

The primary object of the invention is to provide a sectional nut which may be removed from the valve stem by disconnecting the sections, thereby eliminating the necessity of unscrewing the nut throughout the entire length of the valve stem.

A further object of the invention is to provide a lock nut to be used in connection with the valve stem nut, whereby the sections of the valve stem nut will be held to the valve stem, and locked against movement.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
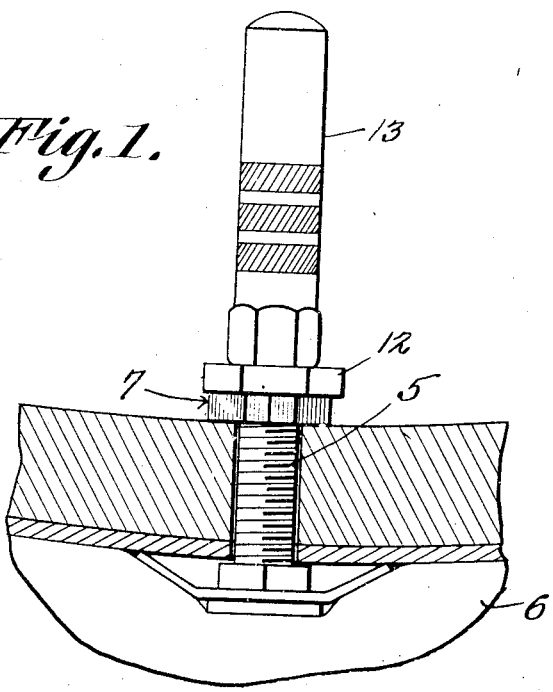
Figure 1 is a fragmental elevational view of an inner tube illustrating a valve stem supplied with a nut constructed in accordance with the invention.
Figure 3:
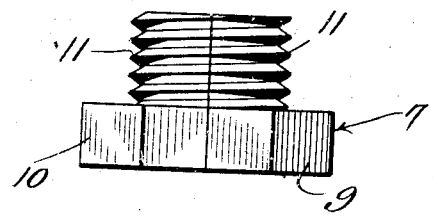
Figure 3 is a side elevational view of the nut.
Figure 2:
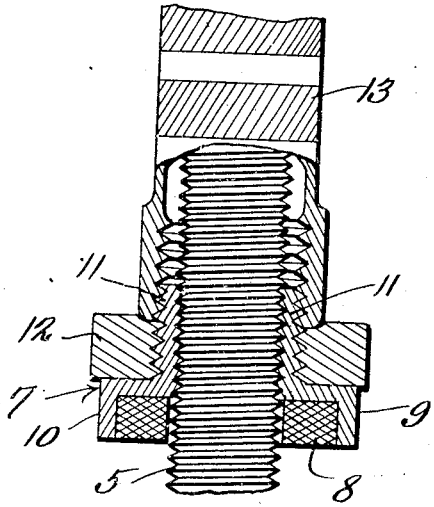
Figure 2 is an elevational view of a valve stem, the cap and nut, forming the essence of this invention being shown in section.
Figure 4:
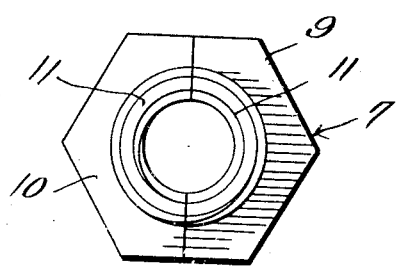
Figure 4 is a plan view thereof.

Referring to the drawing in detail, the reference character 5 indicates a threaded valve stem which is of the usual construction, the same being secured to the tube 6 in the usual and well known manner.

The reference character 7 indicates the section nut forming the essence of the invention and which is used in connection with a valve stem for supporting the washer 8 that is adapted to be forced against the felloe of a wheel, to insure against foreign matter entering between the valve stem and opening in the felloe, through which the valve stem passes.

The nut 7 is split to provide sections 9 and 10, which sections are formed with extensions 11 that are threaded throughout their lengths to accommodate the locking nut 12 adapted to move over the threaded extensions 11 to hold them into engagement with the valve stem.

The nut 12 is of a thickness so that portions of the threaded extension 11 will extend beyond the nut 12 to be engaged by the threaded portion of the cap 13, that is of the usual construction and employed in connection with valve stems.

Thus it will be seen that should it be desired to remove the nut, as is necessary upon the removal of the tire, it is only necessary to loosen the nut 12, allowing the section to move out of engagement with the threaded valve stem.

In order to replace the sectional nut, the sections 9 and 10 are placed around the valve stems at a point adjacent to the felloe, whereupon the locking nut 12 is moved over the threaded extensions 11 of the nut sections to the end that the sections are brought into close engagement with the valve stem, and that by slightly rotating the nut 7, when it has been positioned adjacent to the felloe, the nut will be moved into close engagement with the felloe to accomplish its purpose.

I claim:—

A quick detachable nut including sections, each of said sections having a curved flange to support a washer, said sections having internal and external threads, a nut threaded on the sections to hold the sections together, and a cap adapted to be secured to the sections to lock the nut against movement.

In testimony that I claim the foregoing as my own, I have hereto affixed my signature.

GEORGE L. CROWDER.